(12) United States Patent
Lim et al.

(10) Patent No.: US 12,442,433 B1
(45) Date of Patent: Oct. 14, 2025

(54) DRIVING DEVICE FOR VEHICLE

(71) Applicants: HYUNDAI MOTOR COMPANY, Seoul (KR); KIA CORPORATION, Seoul (KR)

(72) Inventors: Woo Hyun Lim, Gyeonggi-do (KR); Dae In Lee, Gyeonggi-do (KR); Ki Seok Kim, Gyeonggi-do (KR); Kyoung Chul Min, Gyeonggi-do (KR); Jong Sool Park, Gyeonggi-do (KR); Kyung Won Suh, Gyeonggi-do (KR); Yeo Hae Lee, Gyeonggi-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/938,642

(22) Filed: Nov. 6, 2024

(30) Foreign Application Priority Data

Jul. 1, 2024 (KR) .................. 10-2024-0086245

(51) Int. Cl.
  *F16H 1/28* (2006.01)
  *B60K 17/04* (2006.01)
  *F16H 1/36* (2006.01)
  *F16H 57/02* (2012.01)

(52) U.S. Cl.
  CPC .......... *F16H 1/2845* (2013.01); *B60K 17/046* (2013.01); *F16H 1/2836* (2013.01); *B60G 2204/4191* (2013.01); *F16H 1/36* (2013.01); *F16H 2057/02043* (2013.01)

(58) Field of Classification Search
  CPC .... F16H 1/2845; F16H 1/2827; F16H 1/2818; F16H 1/2836; F16H 1/36; F16H 1/48; F16H 1/006; F16H 57/08; F16H 57/082; F16H 35/06; B60K 17/046; B60G 2204/4191
  See application file for complete search history.

(56) References Cited

U.S. PATENT DOCUMENTS

| | | | |
|---|---|---|---|
| 2,893,268 A * | 7/1959 | Liebel ................... | F16H 1/2836 74/411 |
| 12,122,230 B2 * | 10/2024 | Park ....................... | F16H 1/2818 |
| 12,241,525 B1 * | 3/2025 | Lim ....................... | B60K 17/043 |
| 12,259,021 B1 * | 3/2025 | Lim ....................... | F16H 1/46 |

* cited by examiner

*Primary Examiner* — Timothy Hannon
(74) *Attorney, Agent, or Firm* — MCDONNELL BOEHNEN HULBERT & BERGHOFF LLP (57) ABSTRACT

The present disclosure includes a carrier supported on the vehicle body, a ring gear installed such that a rotation axis thereof is concentric with a central axis of the carrier, a wheel hub splined to the ring gear, a sun gear having a rotation axis parallel to the rotation axis of the ring gear and installed to have a variable inter-axis distance, the sun gear being configured to receive power from outside, a final gear supported on the carrier to be meshed with the ring gear, a link mechanism interconnecting the sun gear and the final gear such that a connection angle changes depending on a change in the inter-axis distance between the sun gear and the ring gear, and a gear train to continuously establish a power transmission state between the sun gear and the ring gear regardless of the change in the inter-axis distance.

13 Claims, 6 Drawing Sheets

DRIVING DEVICE FOR VEHICLE

CROSS-REFERENCE TO RELATED APPLICATION(S)

This application is based on and claims priority under 35 U.S.C. 119 to Korean Patent Application No. 10-2024-0086245, filed on Jul. 1, 2024, in the Korean Intellectual Property Office, the disclosure of which is herein incorporated by reference in its entirety.

TECHNICAL FIELD

The present disclosure relates to a device that transmits the driving force of a vehicle to a road surface.

BACKGROUND

A vehicle is configured to transmit power generated from a power source to wheels, thereby exerting the driving force of the vehicle.

The wheels of the vehicle are rotatably supported by knuckles, and the knuckles are supported by a suspension system to the vehicle body, thereby maintaining continuously stable contact with the ground while allowing for the absorption of relative displacements between the vehicle body and the wheels according to the driving of the vehicle, which ensures the ride comfort and driving performance of the vehicle.

Meanwhile, the driving device for the vehicle transmits power from the rotational power source, such as an engine or motor, to the wheels to drive the vehicle.

Recently, in-wheel motor driving devices in which the motors are directly installed on the driving wheels, have been proposed, but are not widely used due to issues such as motor durability and ride comfort problems arising from increased unsprung mass.

The foregoing described as the background art is intended merely to aid in the understanding of the background of the present disclosure, and is not intended to mean that the present disclosure falls within the purview of the related art already known to those skilled in the art.

SUMMARY

The present disclosure is to provide a driving device of a vehicle that receives power from a rotational power source such as a motor and outputs a gear-shifted rotational force, in which the input power can be appropriately gear down to achieve improved hill-climbing and acceleration performance, since the power source such as a motor can be separated from the wheels that are subjected to severe shocks and vibrations, the durability of the power source can be enhanced, superior ride comfort can be ensured by reducing the unsprung mass of the vehicle compared to in-wheel motor drive systems, and continuous power transmission from the power source can be achieved in response to the movement of the wheels without using constant velocity joints, thereby reducing the space between the power source and the wheels and ultimately improving space utilization between the left and right wheels.

In view of the foregoing, a driving device for a vehicle of the present disclosure includes a carrier supported on the vehicle body, a ring gear installed such that a rotation axis thereof is concentric with a central axis of the carrier, a wheel hub coupled to the ring gear via a spline, a sun gear having a rotation axis parallel to the rotation axis of the ring gear and installed to have a variable inter-axis distance from the rotation axis of the ring gear, the sun gear being configured to receive power from outside, a final gear supported on the carrier to be meshed with the ring gear, a link mechanism interconnecting the sun gear and the final gear such that a connection angle changes depending on a change in the inter-axis distance between the sun gear and the ring gear, and a gear train provided in the link mechanism to continuously establish a power transmission state between the sun gear and the ring gear regardless of the change in the inter-axis distance between the sun gear and the ring gear.

A carrier boss may protrude at an outer center of the carrier, and the ring gear may be rotatably supported on the carrier boss.

The wheel hub may have an outer peripheral surface coupled to the ring gear via a spline, and an inner peripheral surface rotatably supported on the carrier boss via a wheel bearing.

The carrier boss may include an engagement ledge configured to restrict insertion of the wheel bearing, and a locking screw portion to which a locking nut configured to restrain the inserted wheel bearing is fastened, and the engagement ledge and the locking screw portion may be integrated on the carrier boss.

An outer snap ring may be coupled to prevent separation of the ring gear coupled to the wheel hub via the spline, and an inner snap ring may be coupled to prevent separation of the wheel hub and the wheel bearing.

The carrier may include a disk-shaped outer carrier part with the carrier boss provided thereon, an inner carrier part spaced in parallel to the outer carrier part, a bridge part interconnecting the outer carrier part and the inner carrier part, and a pinion shaft supported by the outer carrier part and the inner carrier part to rotatably support the final gear and the link mechanism.

Along the outer periphery of the outer carrier part and the inner carrier part, multiple bridge parts may be provided to be spaced apart from the final gear meshed with the ring gear.

The inner carrier part of the carrier may be provided with a carrier opening that opens to allow the input shaft connected to transmit power to the sun gear to move relative to the carrier depending on a change in an inter-axis distance between the sun gear and the ring gear.

The carrier opening may be configured such that the width in the up-and-down direction is longer than the width in the front-and-rear direction.

The ring gear may be integrally connected to a sleeve that is coupled with the wheel hub via a spline while encasing the exterior of the outer carrier part.

The link mechanism may include a first link and a second link that are connected to allow relative rotation, and a joint gear may be installed on a rotation shaft that supports the first link and the second link to be relatively rotatable, and the gear train may include the joint gear, the final gear, a first intermediate gear interconnecting the sun gear and the joint gear, and a second intermediate gear interconnecting the joint gear and the final gear.

The sun gear, the joint gear, and the final gear may be all configured to have the same number of teeth.

Multiple link mechanisms may be arranged around the sun gear, and the multiple final gears constituting the link mechanisms may be arranged on the carrier at regular intervals along a circumferential direction.

Multiple balance gears meshed with the ring gear and rotatably supported on the carrier may be provided between the multiple final gears.

According to the present disclosure, it is possible to provide a driving device of a vehicle that receives power from a rotational power source such as a motor and outputs a gear-shifted rotational force, in which the input power can be appropriately gear down to achieve improved hill-climbing and acceleration performance, since the power source such as a motor can be separated from the wheels that are subjected to severe shocks and vibrations, the durability of the power source can be enhanced, superior ride comfort can be ensured by reducing the unsprung mass of the vehicle compared to in-wheel motor drive systems, and continuous power transmission from the power source can be achieved in response to the movement of the wheels without using constant velocity joints, thereby reducing the space between the power source and the wheels and ultimately improving space utilization between the left and right wheels.

In particular, according to the present disclosure, the ring gear and the wheel can be supported on the carrier in a robust and stable state, thereby enabling smooth and seamless driving of the vehicle and enhancing the durability of the driving device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments set forth herein will be described in detail with reference to the accompanying drawings, and the same or similar elements are given the same and similar reference numerals regardless of figure numbers, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for the purpose of distinguishing one element from other elements.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Referring to FIGS. 1 to 7, the driving device 100 for a vehicle according to the present disclosure includes a carrier 3 supported on the vehicle body 1, a ring gear 5 installed such that a rotation axis thereof is concentric with the central axis of the carrier 3, a wheel hub 7 coupled to the ring gear 5 with splines 23, a sun gear 9 that has a rotation axis parallel to the rotation axis of the ring gear 5 and is installed so that the inter-axis distance from the rotation axis of the ring gear is changeable, wherein the sun gear is configured to receive power from the outside, a final gear 11 supported on the carrier 3 to be meshed with the ring gear 5, a link mechanism 13 that interconnects the sun gear 9 and the final gear 11 so as to allow a connection angle to change depending on the inter-axis distance change between the sun gear 9 and the ring gear 5, and a gear train 15 provided in the link mechanism 13 to continuously form a power transmission state between the sun gear 9 and the ring gear 5 regardless of the change in the inter-axis distance between the sun gear 9 and the ring gear 5.

Figure 1:
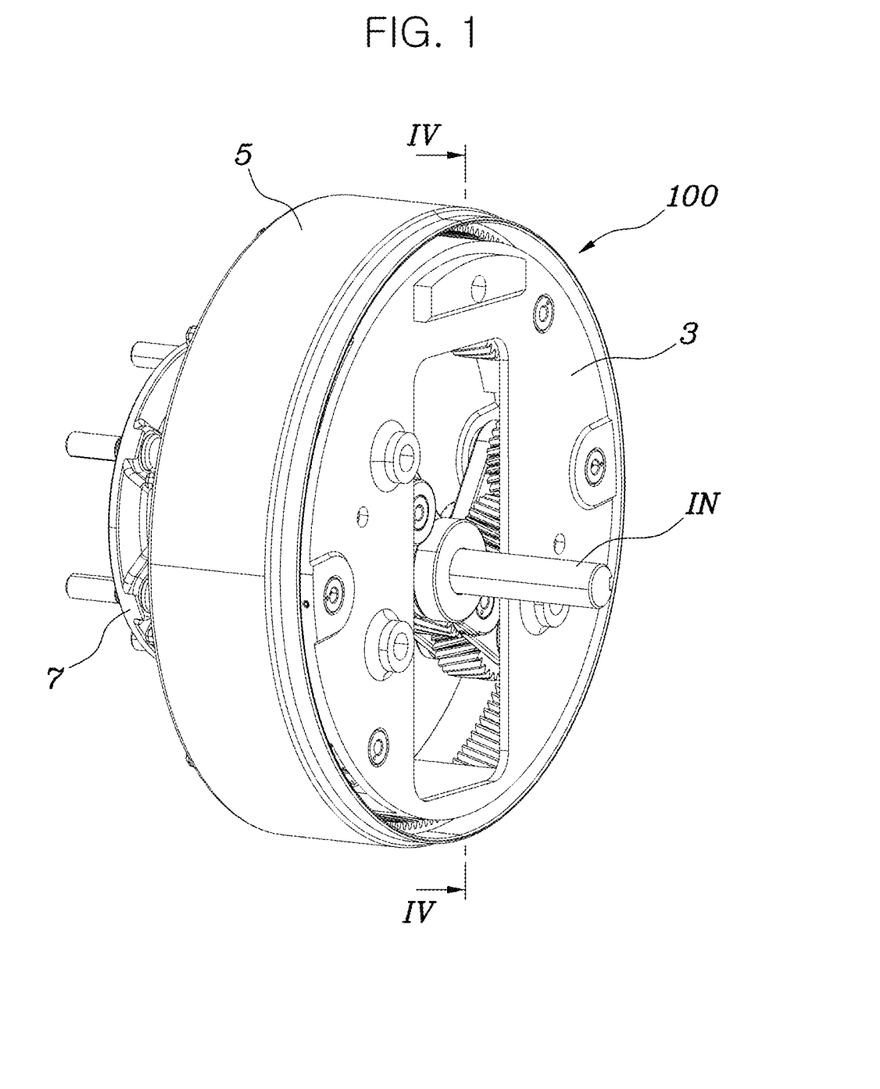
FIG. 1 is a view illustrating a driving device for a vehicle according to the present disclosure.
Figure 6:
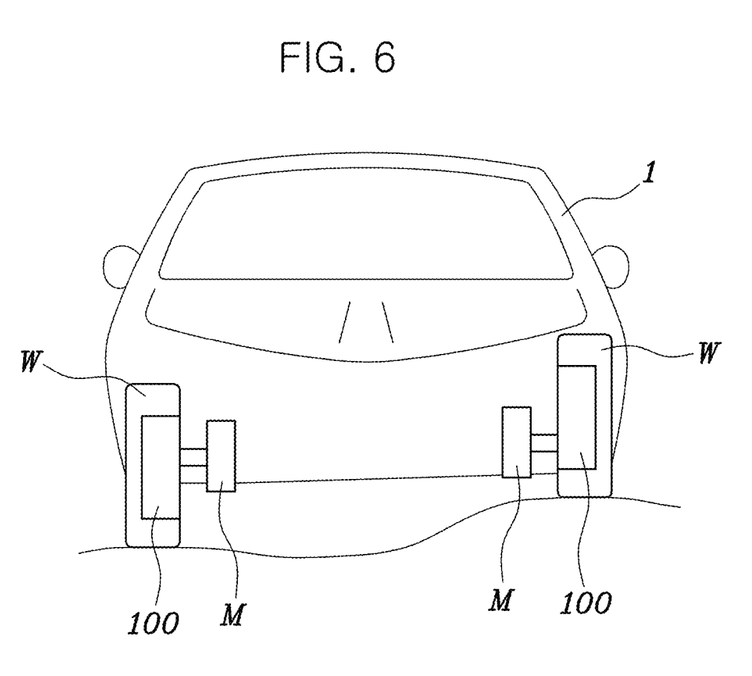
FIG. 6 is a view illustrating the state in which the driving device of the present disclosure is mounted on a vehicle.
Figure 7:
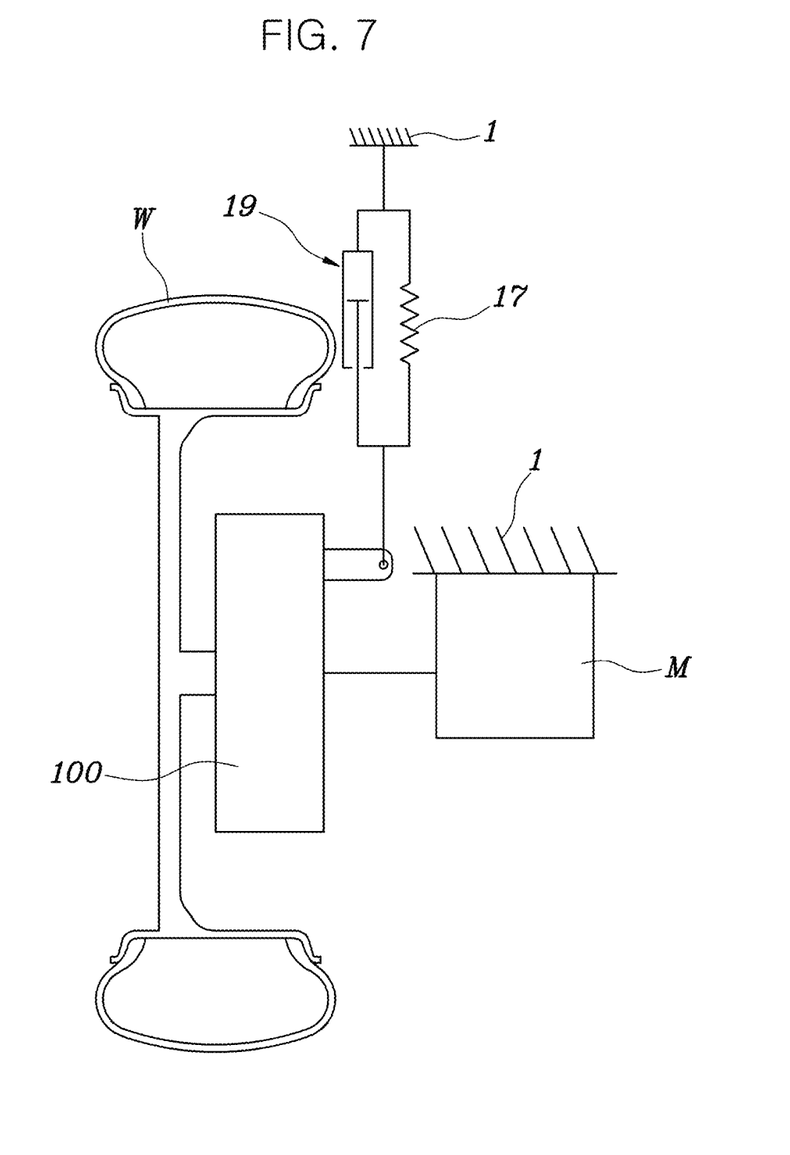
FIG. 7 is a view illustrating a connection structure between the driving device and a vehicle body of FIG. 6.

A wheel W is mounted on the wheel hub 7, and the carrier 3 is supported to the vehicle body 1 via a suspension system including a spring 17 and a damper 19 and is configured such that power can be supplied to the sun gear 9 from a power source such as the motor M installed on the vehicle body 1 via the input shaft IN.

That is, the driving device 100 of the present disclosure has a state in which the carrier 3 is supported with respect to the vehicle body 1 by the suspension system to be capable of being raised and lowered relative to the vehicle body 1, and is configured such that the sun gear 9 receives power via the input shaft IN, which is then reduced and transmitted to the ring gear 5 via the gear train 15, and the rotational force of the ring gear 5 is transmitted to the wheel W via the wheel hub 7.

Therefore, the driving device of the present disclosure allows for the power source, such as the motor M, to be installed separately from the wheel W, which is subject to severe shocks and vibrations. As a result, the durability of the power source can be improved, and superior ride comfort can be ensured by reducing the unsprung mass compared to in-wheel motor driving devices.

Figure 4:
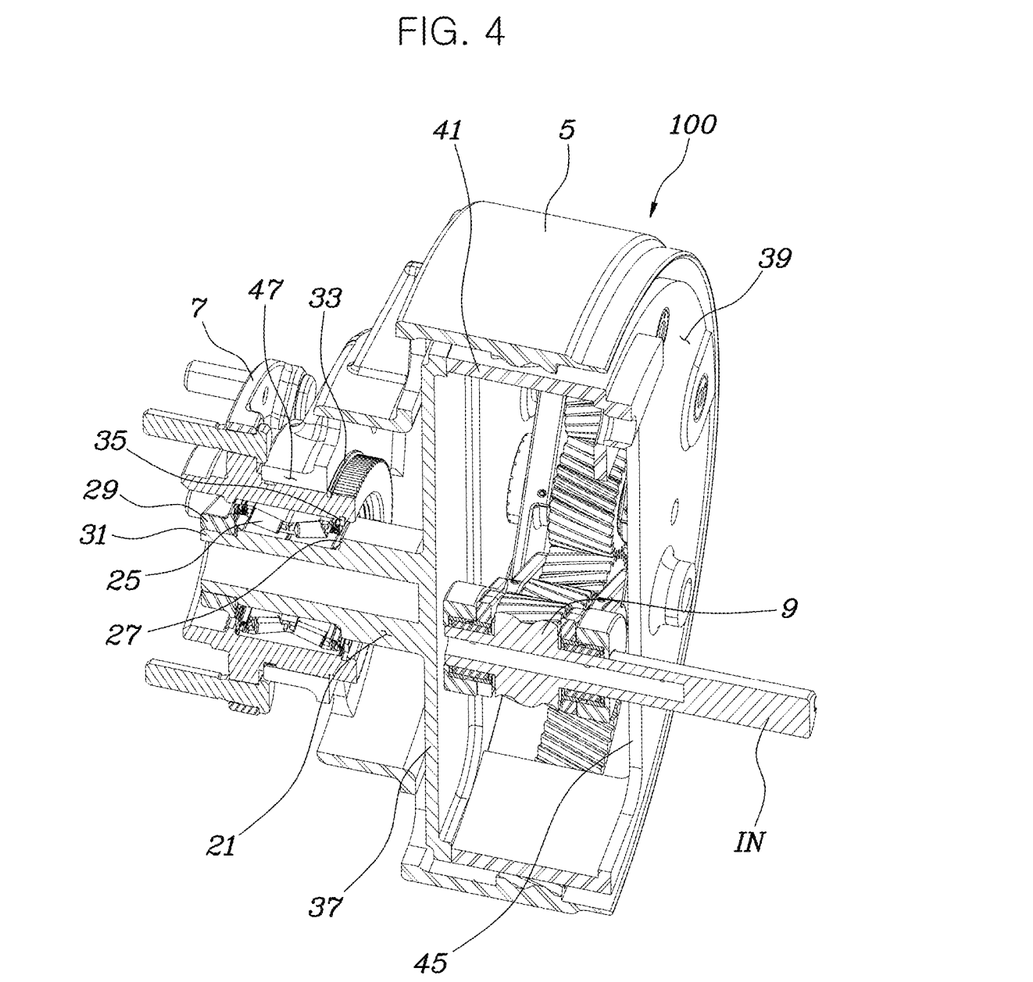
FIG. 4 is a cross-sectional view taken along line IV-IV in FIG. 1.

A carrier boss 21 may protrude at an outer center of the carrier 3, and the ring gear 5 may be rotatably supported on the carrier boss 21.

That is, the outer peripheral surface of the wheel hub 7 is coupled to the ring gear 5 via a spline 23, and the inner peripheral surface is rotatably supported on the carrier boss 21 via a wheel bearing 25. Ultimately, the rotation axis of the ring gear 5 is rotatably supported concentrically with the central axis of the carrier 3.

Therefore, the ring gear 5 is rotatably supported on the carrier 3 in a stable state, and a wheel W is connected to the ring gear 5 via the wheel hub 7. Ultimately, the wheel W is rotatably supported on the carrier 3 in the stable state, and is supported to be capable of being raised and lowered relative to the vehicle body 1 via a suspension system.

The carrier boss 21 may include an engagement ledge 27 configured to restrict insertion of the wheel bearing 25, and a locking screw portion 31 to which a locking nut 29 configured to restrain the inserted wheel bearing 25 is fastened, and the engagement ledge 27 and the locking screw portion 31 may be integrated on the carrier boss.

Therefore, after pushing the wheel bearing 25 into the engagement ledge 27 of the carrier boss 21 and fastening the locking nut 29, the wheel bearing 25 is fixed in the state of being inserted into the carrier boss 21.

An outer snap ring 33 is coupled to the wheel hub 7 to prevent separation of the ring gear 5 coupled to the wheel hub 7 via the spline 23, and an inner snap ring 35 is coupled to prevent separation of the wheel hub and the wheel bearing 25.

Accordingly, when inserting the wheel bearing 25 and the ring gear 5 into the wheel hub 7 and then fastening the inner snap ring 35 and the outer snap ring 33, the wheel hub 7, the wheel bearing 25, and the ring gear 5 are coupled together. In this coupled state, when inserting the wheel bearing 25 into the carrier boss 21 and fastening the locking nut 29, it is possible to ensure that the wheel hub 7 and ring gear 5 are rotatably supported and constrained relative to the carrier boss 21.

Figure 2:
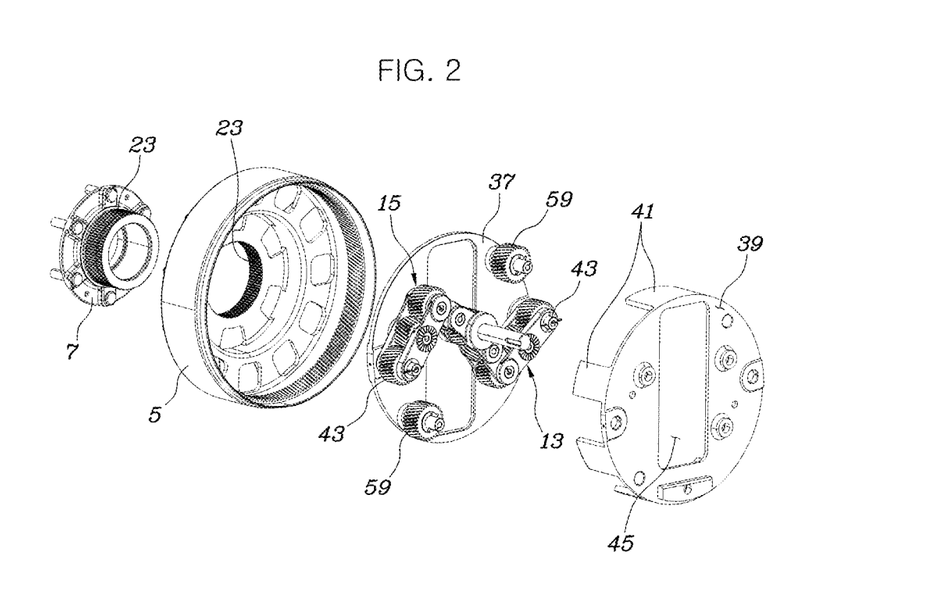
FIG. 2 is an exploded perspective view of the driving device of FIG. 1.
Figure 3:
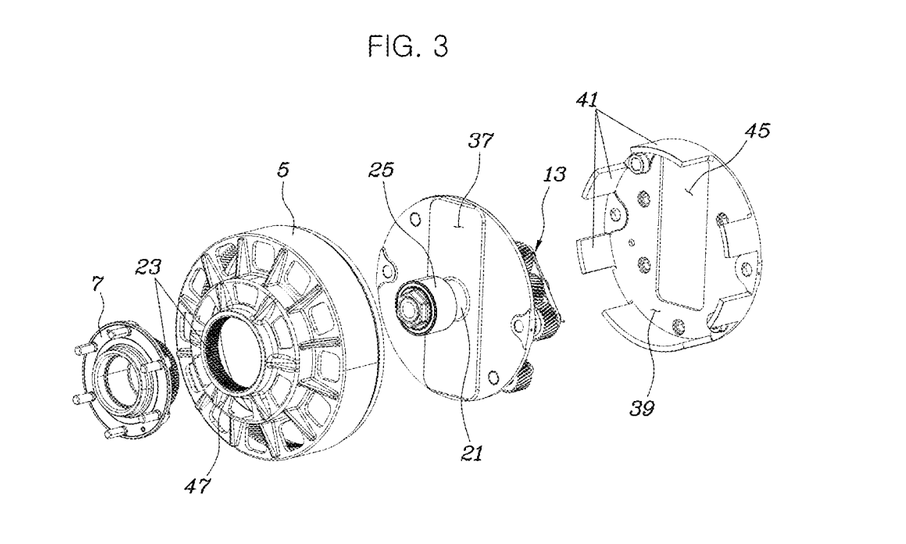
FIG. 3 is another view of the driving device of FIG. 2, taken from the opposite direction of FIG. 2.

In the present embodiment, the carrier 3 includes a disk-shaped outer carrier part 37 with the carrier boss 21 provided thereon, an inner carrier part 39 spaced in parallel to the outer carrier part 37, a bridge part 41 interconnecting the outer carrier part 37 and the inner carrier part 39, and a pinion shaft 43 supported by the outer carrier part 37 and the inner carrier part 39 to rotatably support the final gear and the link mechanism 13.

In addition, along the outer periphery of the outer carrier part 37 and the inner carrier part 39, multiple bridge parts 41 are provided to be spaced apart from the final gear 11 meshed with the ring gear 5.

Therefore, the carrier 3 very securely supports the final gear 11 and the link mechanism 13 with the inner carrier part 39 and the outer carrier part 37, ensuring that the final gear 11 remains stably meshed with the ring gear 5.

Meanwhile, a carrier opening 45 is formed in the inner carrier part 39 of the carrier 3, wherein the carrier opening 45 opens to allow the input shaft IN, which is connected to transmit power to the sun gear 9, to relatively move with respect to the carrier 3 depending on a change in the inter-axis distance between the sun gear 9 and the ring gear 5.

Therefore, even when the sun gear 9 moves relative to the ring gear 5 and the carrier 3, the input shaft IN is capable of transmitting power stably to the sun gear 9 without interfering with the carrier 3.

Preferably, the carrier opening 45 is formed such that the width in the up-and-down direction is longer than the width in the front-and-rear distance, so that the suspension system of the vehicle can sufficiently allow for vertical movement of the ring gear 5 and the carrier 3 relative to the sun gear 9.

For reference, the front-and-rear direction here refers to the front-and-rear direction with reference to the vehicle body 1.

The ring gear 5 encases the outside of the outer carrier part 37 and is integrally connected to the sleeve 47, which is coupled with the wheel hub 7 via the spline 23.

Accordingly, the sleeve 47 of the ring gear 5 is coupled to the wheel hub 7 via the spline 23 and is restrained to the wheel hub 7 by the outer snap ring 33.

Figure 5:
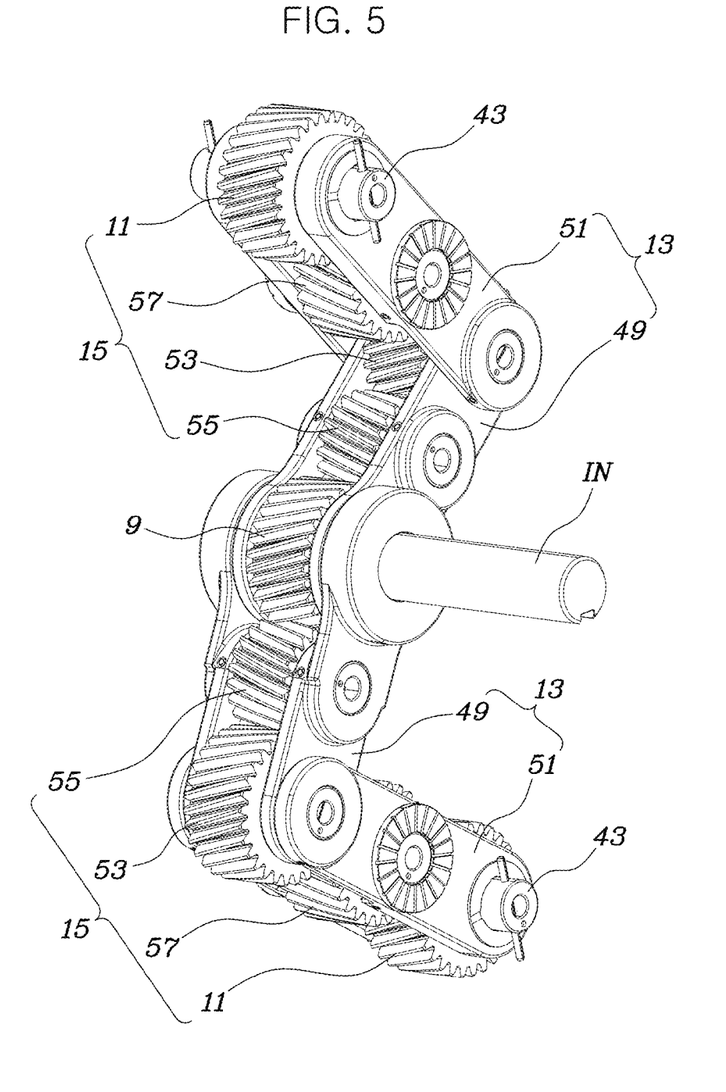
FIG. 5 is a view illustrating the link mechanism of FIG. 2.

In the embodiment, the link mechanism 13 includes a first link 49 and a second link 51, which are connected to be rotatable relative to each other, a joint gear 53 is installed on a rotation shaft that supports the first link 49 and the second link 51 to be rotatable relative to each other, and the gear train 15 includes the joint gear 53, the final gear 11, a first intermediate gear 55 interconnecting the sun gear 9 and the joint gear 53, and a second intermediate gear 57 interconnecting the joint gear 53 and the final gear 11.

Here, the sun gear 9, the joint gear 53, and the final gear 11 are all configured to have the same number of teeth.

When the sun gear 9, the joint gear 53, and the final gear 11 have the same number of teeth as described above, regarding the relative motion of the rotation axes of the sun gear 9 and the ring gear 5, the relative phase between the sun gear 9 and the ring gear 5 is maintained constant.

Here, regarding the relative motion of the sun gear 9 and the ring gear 5, the fact that the relative phase thereof is maintained constant means that, if the sun gear 9 does not turn around on its own axis, the ring gear 5 will also not rotate, even if there is vertical or lateral movement of the ring gear 5 relative to the sun gear 9.

Therefore, the power transmitted from the sun gear 9 is delivered to the ring gear 5 at a constant speed, regardless of an inter-axis distance change between the sun gear 9 and the ring gear 5. As a result, when the power generated by the motor M is transmitted from the sun gear 9 to the wheel W via the ring gear 5, even if the ring gear 5 and the wheel W move vertically or horizontally relative to the rotational axis of the motor M or the sun gear 9, the phase of the motor M connected to the sun gear 9 and the phase of the wheel W connected to the ring gear 5 remain unchanged. Therefore, the driving force of the vehicle can be controlled stably via the motor M so that stable driving of the vehicle can be achieved.

If the conditions mentioned above are not met, and the number of teeth differs for any of the sun gear 9, the joint gear 53, and the final gear 11, even if the motor M rotates at a constant speed, the ring gear 5 and the wheel may move relative to the sun gear 9 and the motor M, causing a phase difference between the sun gear 9 and the ring gear 5 and resulting in relative rotation, which may lead to vibrations in the vehicle depending on the driving direction of the vehicle.

Multiple link mechanisms 13 are arranged around the sun gear 9, and the multiple final gears 11 constituting the link mechanisms 13 may be arranged on the carrier 3 at regular intervals along the circumferential direction.

In addition, between the multiple final gears 11, a number of balance gears 59, which are meshed with the ring gear 5 and rotatably supported on the carrier 3, are provided.

Therefore, the ring gear 5 is supported in rotation by the carrier boss 21 with respect to the carrier 3, and also supported in rotation by the multiple final gears 11 and balance gears 59, thereby implementing a robust and stable rotational support state of the ring gear 5 relative to the carrier 3.

In addition, when the multiple final gears 11 and balance gears 59 are evenly distributed inside the ring gear 5 as described above, the load acting on the ring gear 5 is evenly distributed, which is capable of preventing uneven deformation of the ring gear 5 and improving durability.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A driving device for a vehicle, the driving device comprising:
    a carrier supported on a vehicle body;
    a ring gear installed such that a rotation axis thereof is concentric with a central axis of the carrier;
    a wheel hub coupled to the ring gear with splines;
    a sun gear having a rotation axis parallel to the rotation axis of the ring gear and installed to have a variable inter-axis distance from the rotation axis of the ring gear, the sun gear being configured to receive power from outside;
    a final gear supported on the carrier to be meshed with the ring gear;
    a link mechanism interconnecting the sun gear and the final gear such that a connection angle changes depending on a change in the inter-axis distance between the sun gear and the ring gear; and
    a gear train provided in the link mechanism to continuously establish a power transmission state between the sun gear and the ring gear regardless of the change in the inter-axis distance between the sun gear and the ring gear, wherein a carrier boss protrudes at an outer center of the carrier, and wherein the ring gear is rotatably supported on the carrier boss.

2. The driving device of claim 1, wherein the wheel hub has an outer peripheral surface coupled to the ring gear via the splines and an inner peripheral surface rotatably supported on the carrier boss via a wheel bearing.

3. The driving device of claim 2, wherein the carrier boss comprises an engagement ledge configured to restrict insertion of the wheel bearing, and a locking screw portion to which a locking nut configured to restrain the inserted wheel bearing is fastened, the engagement ledge and the locking screw portion being integrated with each other.

4. The driving device of claim 3, wherein an outer snap ring is coupled to the wheel hub to prevent separation of the ring gear coupled to the wheel hub via the spline, and an inner snap ring is coupled to prevent separation of the wheel hub and the wheel bearing.

5. The driving device of claim 2, wherein the carrier comprises
    a disk-shaped outer carrier part with the carrier boss provided thereon,
    an inner carrier part spaced in parallel to the outer carrier part,
    a bridge part interconnecting the outer carrier part and the inner carrier part, and
    a pinion shaft supported by the outer carrier part and the inner carrier part to rotatably support the final gear and the link mechanism.

6. The driving device of claim 5, wherein, along an outer periphery of the outer carrier part and the inner carrier part, multiple bridge parts are provided to be spaced apart from the final gear meshed with the ring gear.

7. The driving device of claim 5, wherein the inner carrier part of the carrier is provided with a carrier opening that opens to allow an input shaft connected to transmit power to the sun gear to move relative to the carrier depending on a change in an inter-axis distance between the sun gear and the ring gear.

8. The driving device of claim 7, wherein the carrier opening is configured such that a width in an up-and-down direction is longer than a width in a front-and-back direction.

9. The driving device of claim 5, wherein the ring gear is integrally connected to a sleeve that encases an exterior of the outer carrier part and is splined to the wheel hub.

10. The driving device of claim 1, wherein the link mechanism comprises a first link and a second link that are connected to be relatively rotatable,
    wherein a joint gear is installed on a rotation shaft that supports the first link and the second link to be relatively rotatable, and
    wherein the gear train comprises the joint gear, the final gear, a first intermediate gear interconnecting the sun gear and the joint gear, and a second intermediate gear interconnecting the joint gear and the final gear.

11. The driving device of claim 10, wherein the sun gear, the joint gear, and the final gear are all configured to have a same number of teeth.

12. The driving device of claim 11, wherein multiple link mechanisms are arranged around the sun gear, and
    the multiple final gears constituting the link mechanisms are arranged on the carrier at regular intervals along a circumferential direction.

13. The driving device of claim 12, wherein multiple balance gears meshed with the ring gear and rotatably supported on the carrier are provided between the multiple final gears.

* * * * *